(12) United States Patent
Herrmann (10) Patent No.: US 10,967,210 B2
(45) Date of Patent: Apr. 6, 2021

(54) TRANSPORTATION VEHICLE POWER SAFETY

(71) Applicants: VOLKSWAGEN AKTIENGESELLSCHAFT, Wolfsburg (DE); PORSCHE AG, Stuttgart (DE); AUDI AG, Ingolstadt (DE)

(72) Inventor: Mirko Herrmann, Mountain View, CA (US)

(73) Assignees: Volkswagen Aktiengesellschaft; Audi AG; Porsche AG

( * ) Notice: Subject to any disclaimer, the term of this patent is extended or adjusted under 35 U.S.C. 154(b) by 155 days.

(21) Appl. No.: 16/362,865

(22) Filed: Mar. 25, 2019

(65) Prior Publication Data

US 2020/0306572 A1 Oct. 1, 2020

(51) Int. Cl.
*A62C 3/16* (2006.01)
*A62C 3/07* (2006.01)
*H01M 10/42* (2006.01)
*A62C 35/10* (2006.01)

(52) U.S. Cl.
CPC .......... *A62C 3/16* (2013.01); *A62C 3/07* (2013.01); *A62C 35/10* (2013.01); *H01M 10/4235* (2013.01); *H01M 2200/10* (2013.01); *H01M 2220/20* (2013.01)

(58) Field of Classification Search
CPC . A62C 3/16; A62C 3/07; A62C 35/10; H01M 10/4235; H01M 2200/10; H01M 2220/20
USPC ............ 169/26, 35, 62; 429/57, 61, 99, 122
See application file for complete search history.

(56) References Cited

U.S. PATENT DOCUMENTS

| | | | | |
|---|---|---|---|---|
| 8,309,240 | B1* | 11/2012 | Li | H01M 10/0587 429/57 |
| 2017/0113080 | A1* | 4/2017 | Specht | A62C 3/16 |
| 2019/0097274 | A1* | 3/2019 | Linde | H01M 10/4235 |
| 2019/0348649 | A1* | 11/2019 | Ryu | H01M 2/1077 |
| 2020/0076009 | A1* | 3/2020 | Kwok | H01M 10/0525 |

FOREIGN PATENT DOCUMENTS

| | | |
|---|---|---|
| CN | 105489811 A | 4/2016 |
| EP | 0043554 A1 | 7/1981 |
| EP | 3107145 A1 | 12/2016 |
| WO | 2017139826 A1 | 8/2017 |

* cited by examiner

*Primary Examiner* — Steven J Ganey
(74) *Attorney, Agent, or Firm* — Barnes & Thornburg LLP (57) ABSTRACT

Power sources, such as batteries, for transportation vehicles can provide at least partial electric drive power. The power sources can include an activation layer arranged between collectors adapted for opposite charging. The activation layer can include fire suppression system disposed therein for releasing fire suppression agent in response to high and/or excessive temperature.

22 Claims, 6 Drawing Sheets

TRANSPORTATION VEHICLE POWER SAFETY

FIELD

The present disclosure relates to systems, components, and methodologies for power sources in transportation vehicles. More particularly, the present disclosure relates to systems, components, and methodologies for safety systems of transportation vehicles which have power sources, such as electrical power storage and/or generation.

BACKGROUND

Transportation vehicles can include power storage and/or generation, for example, in the form of a chemical battery and/or fuel cell-generator combination which can provide electrical power for use. Electrical power to provide at least some drive propulsion to the transportation vehicle can have particularly powerful electrical power sources. However, such power storage devices can present risks of fire. Designing power sources with consideration for abatement of risks such as fire, can improve safety, reliability, and/or performance of the power source and ultimately the transportation vehicle.

SUMMARY

Consideration of first suppression systems within power storage devices of transposition vehicles can improve the safety of operation and/or performance, for example, for transportation vehicles operating under at least partial electric drive. According to the present disclosure, systems, components, and methodologies are provided for improvements in safety of electrically propelled vehicles.

According to one aspect of the present disclosure, a transportation vehicle for at least partial electric drive operation on roadways, may include a vehicle base including a chassis, a drive train coupled with the chassis to drive the chassis along roadways, and a power storage device connected with the drive train to provide motive power. The power storage device may include a pair of collectors configured for opposite electrical charge from each other, an activation layer comprising electrolyte disposed between the collectors, and a fire suppression means for releasing fire suppression agent responsive to high and/or excessive temperature. The fire suppression means may be disposed within the activation layer.

In disclosed embodiments, the fire suppression means may be adapted to release fire suppression agent responsive to high and/or excessive temperature as a local temperature exceeding a predetermined threshold. The predetermined threshold may include a predetermined temperature. The predetermined threshold may include a predetermined duration of the predetermined temperature.

In disclosed embodiments, the fire suppression means may include at least one container for housing fire suppression agent. The at least one container may include a barrier defining a receptacle for housing the fire suppression agent. The barrier may include a thermoplastic. The thermoplastic may be configured to weaken at high and/or excessive temperature to release the fire suppression agent.

In disclosed embodiments, the thermoplastic may include a melt temperature within the range of 100° F. to 500° F. The thermoplastic may include a melt temperature within the range of 175° F. to 300° F. The at least one container may be engaged with at least one of the pair of collectors and extends longitudinally through the electrolyte of the activation layer. The at least one container may include a plurality of containers spaced apart from each other within the activation layer.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DISCLOSED EMBODIMENTS

Transportation vehicles for operation on roadways can have a variety of propulsion types, among which electric power is becoming more common, whether partial (e.g., hybrid) or fully (e.g., fuel cell, plug-in) electrically propelled. Electric power for propelling vehicles can present challenges, such as challenges in handling high voltage power generation and/or storage. For example, electric vehicles may include high voltage sources such as batteries, cells, and/or generators.

The high energy environments of such electrically driven transportation vehicles can present risks. For example, if damaged or malfunctioning, such power sources can present unpredictable fire hazard. Application of fire suppression materials can aid to control and/or extinguish fires. However, introducing fire suppression materials can reduce the performance of the power source. For example, introduction of fire suppression agents within the electrolyte can degrade the energy flow and thus the performance of the power source. Yet, as discussed herein, maintaining such fire suppression materials as segregated from the electrolyte, but close proximity to the power source, and/or controlling application of the materials to localized areas of the power source, can reduce related performance degradation while enhancing protections against the risk of fire and/or overheating.

Figure 1:
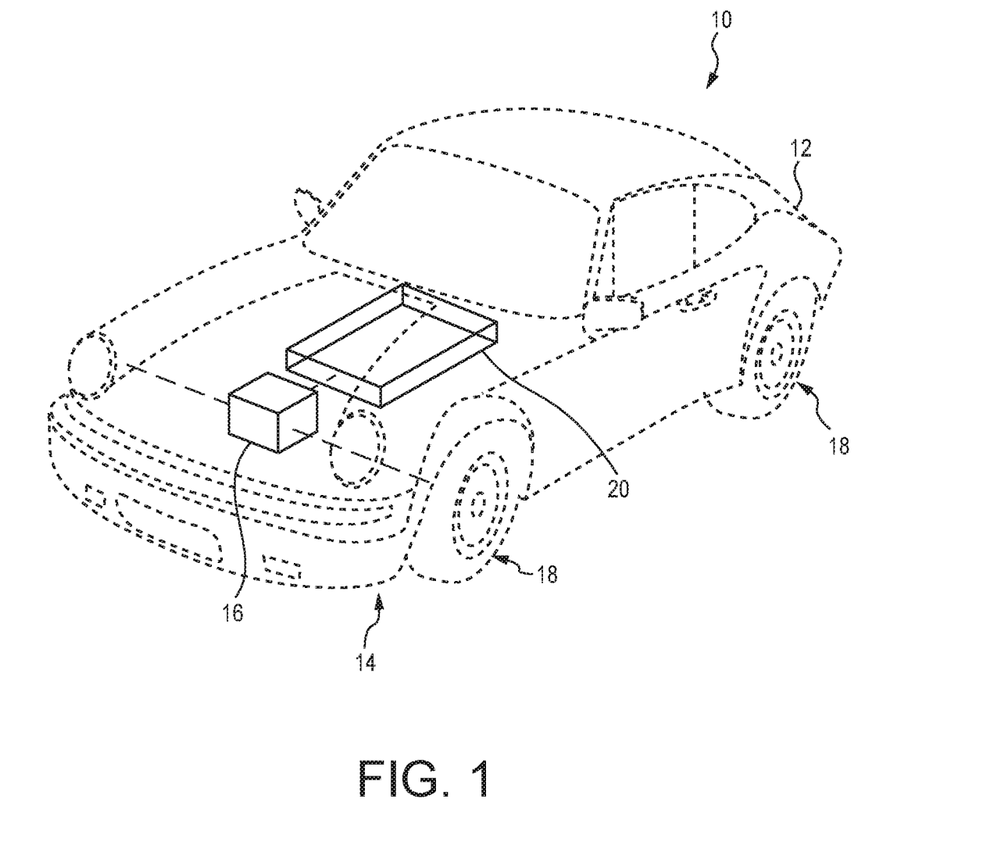
FIG. 1 is a perspective view of a transportation vehicle for operation on roadways showing that the vehicle has a chassis including wheels and showing that the vehicle includes a power system or means for drive power to provide drive to the wheels, the power system including a power source and a drive train.

In the illustrative embodiment as shown in FIG. 1, a vehicle 10 is arranged for at least partial electric motive power for propulsion on roadways. The vehicle 10 may include a vehicle body 12 and chassis 14 which forms a vehicle base. The chassis 14 may include a power train 16 and wheels 18 which can be driven by a power source 20 to provide motive power for propelling the vehicle 10. The power train 16 may include a motor and transmission system to provide motive power to the wheels 18 from the power source 20. In the illustrative embodiment, the power source 20 is an electrical power source in communication to provide electrical power to the electric motor of the power train 16.

Figure 2A:
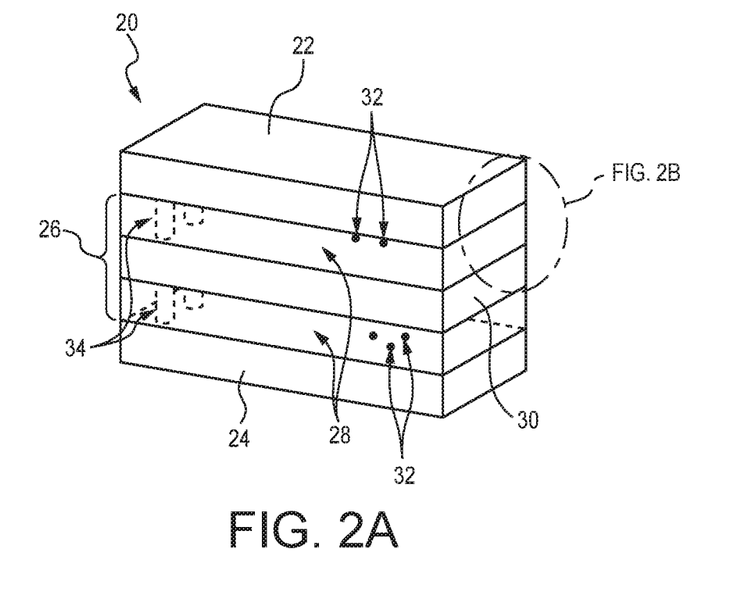
FIG. 2A is a perspective diagrammatic view of a portion of the power source of the transportation vehicle of FIG. 1 showing that the power source is an electric power storage device including connectors for opposite charge having an active section disposed between the connectors, the active section including a separator and active material intermixed with electrolyte arranged on either side of the separator, and showing that the power source includes a fire suppression means for releasing fire suppression agent responsive to high and/or excessive temperature.

Referring to FIG. 2A, the power source 20 is illustratively embodied as a battery, for example, a lithium-ion battery. The power source 20 may include collectors 22, 24 having an anode 22 for positive charge and cathode 24 for negative charge. The collectors 22, 24 may be connected with other systems of the transportation vehicle 10 as terminals to provide electric power, although in power cell embodiments, the terminals may receive electric power. The collectors 22, 24 may be arranged on opposite sides of the power source 20 having an activation section 26 disposed between the collectors 22, 24.

The activation section 26 may include an electrolyte 28 for conducting electrical-chemical exchange through the activation section 26. The electrolyte can include gel polymer electrolyte, although in some embodiments, the electrolyte 28 may include any suitable electrolyte. The activation section 26 may include a separator 30 through which electron exchange can occur. In the illustrative embodiment, active material 32, may be supported on the connectors 22, 24 within the activation section 26 and in communication with the electrolyte 28. For example, the active material 32 may be graphite for the anode 22, and lithium nickel cobalt manganese oxide ($LiNiCoMnO_2$) and/or lithium cobalt oxide ($LiCoO_2$) for the cathode 24, although in some embodiments, any suitable active material may be used. In some embodiments, the connectors 22, 24 themselves may comprise active material.

Figure 2B:
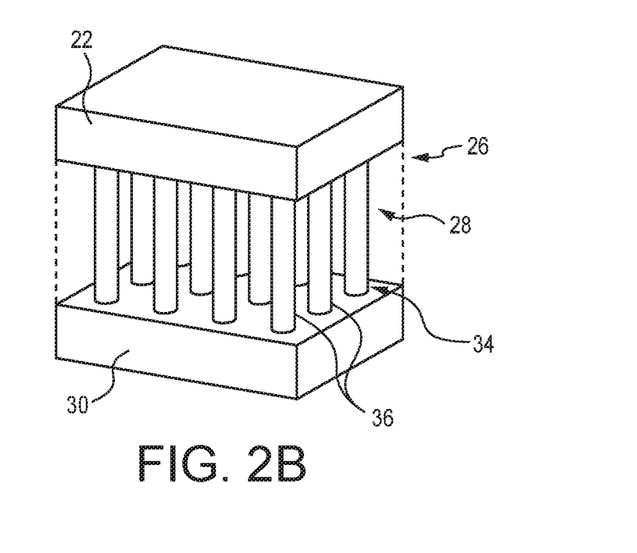
FIG. 2B is a perspective diagrammatic view of a portion of the power source of FIG. 2A showing that the fire suppression means includes containers of fire suppression agent which extend through the active section.

As shown in FIG. 2B, the power source 20 may include a fire suppression system 34 for releasing fire suppression agent responsive to high and/or excessive temperature. The fire suppression system 34 may include a number of containers 36 defining reservoirs for holding fire suppression agent out of contact with the electrolyte 28 under acceptable temperatures. Upon a local temperature exceeding acceptable bounds, the reservoirs may release the fire suppression agent into the electrolyte 28. The containers 36 illustratively connect with the collectors 22, 24 and extend (vertically in FIGS. 2A and 2B) through the activation section 26.

Figure 3A:
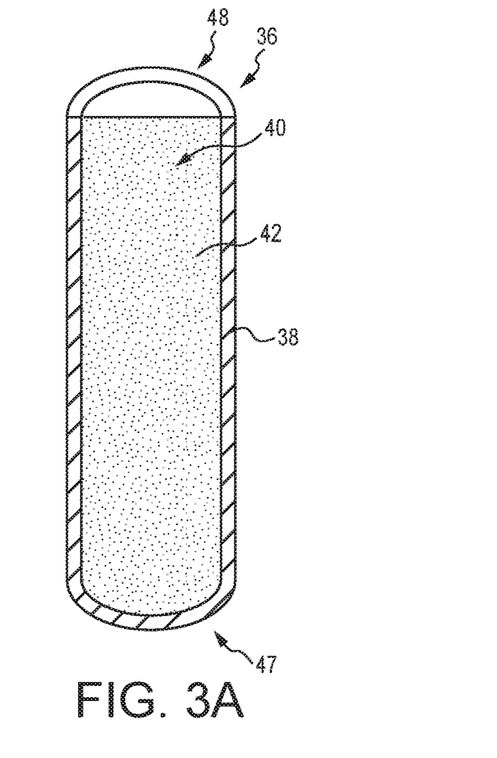
FIG. 3A is a cross-sectional view of a container of the fire suppression means of FIGS. 2A & 2B showing that the container includes a heat-deformable container wall that defines an interior space for housing fire suppression agent.

Referring now to FIG. 3A, the containers 36 may each be formed to have a container wall 38 defining therein a reservoir as receptacle 40 for the fire suppression agent 42. The agent 42 may be arranged loosely within the receptacle 40. The container wall 38 may be formed of a thermoplastic configured to deform at excessive temperatures to release the agent 42 from the receptacle 40. As the agent 42 is released from the receptacle 40 it mixes with the electrolyte 28 to suppress fire.

Figure 3B:
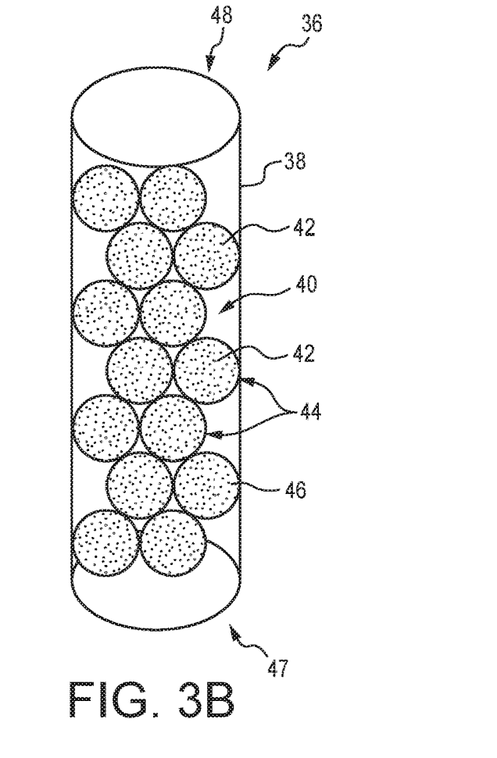
FIG. 3B is a cross-sectional view of a container of the fire suppression means similar to FIG. 3A showing that fire suppression means may include capsules, formed as spheres, for containing the fire suppression agent within the container.

Referring to FIG. 3B, in another embodiment, the container 36 may define the receptacle 40 which houses a number of fire suppression capsules 44. The fire suppression capsules 44 each include a capsule wall 46 defining a reservoir for holding the agent 42. The capsule wall 46 may be formed of thermoplastic configured to deform at excessive temperatures to release the agent 42 from the reservoir. The container wall 38 may also be formed of thermoplastic configured to deform at excessive temperatures. The preformation of the capsules 44 filled with agent 42 may be advantageous during assembly, as discussed below in additional detail. Each capsule 44 may be joined to adjacent capsules using an adhesive, which may include a thermoplastic which is the same or similar to the capsule wall 46. In the illustrative embodiments, the capsule 44 may be formed to have spherical shape, but in some embodiments, may include any suitable shape.

Figure 4A:
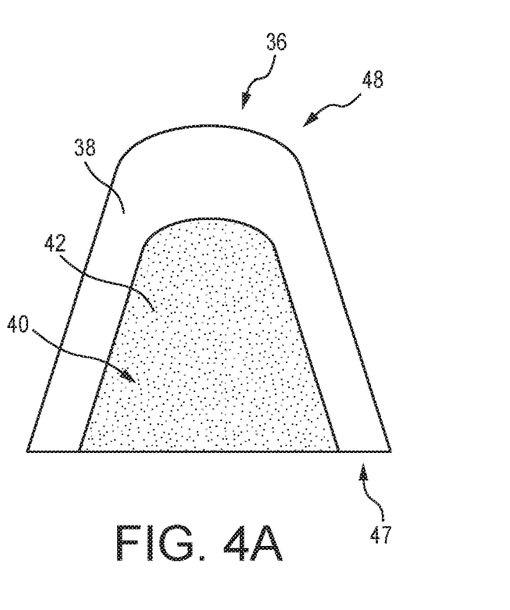
FIGS. 4A & 4B are cross-sectional views of another embodiment of the container of the fire suppression means of FIGS. 2A and 2B showing that the container has a rounded cone shape.
Figure 4B:
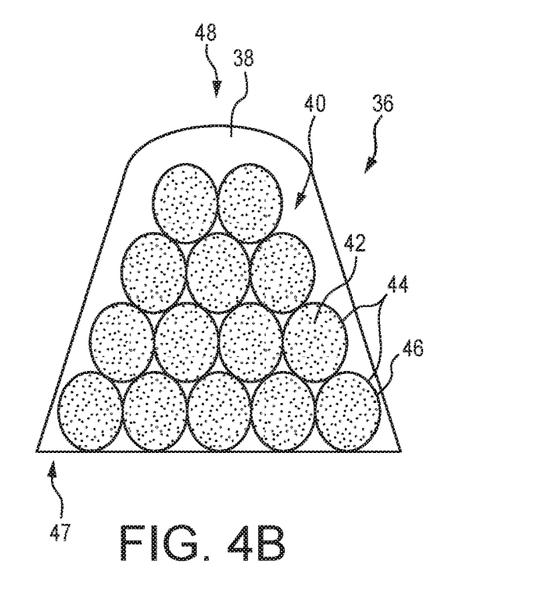

As shown in FIG. 4A, in another embodiment, the containers 36 may be formed to have a rounded cone shape formed by the container wall 38. The container wall 38 defines the receptacle 40 for housing the fire suppression agent 42. As shown in another embodiment of FIG. 4B, the rounded cone container wall 38 may define the receptacle 40 for housing the capsules 44. The end portions 47 of the container wall 38 may connect with the respective collector 22, 24 and the end portions 48 may extend throughout the activation section 26. In the illustrative embodiments, the containers 36 are similar to each other, but in some embodiments, the power source 20 may include containers 36 having different shapes, and/or some containers 36 housing loose agent and some container 36 housing capsules 44.

Figure 5:
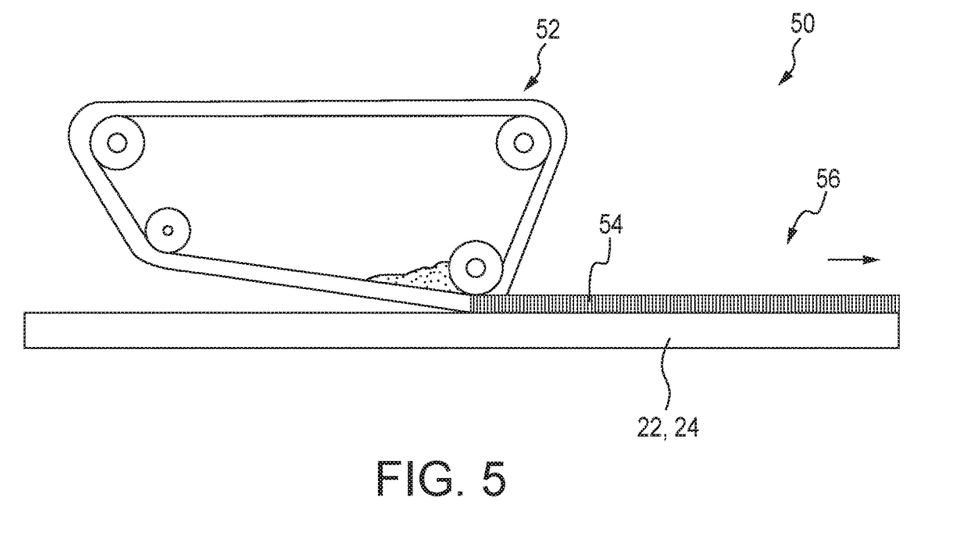
FIG. 5 is an elevation view of a process for creating an assembly of a portion of the power source of FIG. 1 showing that a distributor can continuously arrange a green activation layer onto a collection layer.

Referring now to FIG. 5, a system 50 for manufacturing the power source 20 is shown including a high speed depositor 52. The depositor 52 may be formed as a tape casting machine for depositing the activation section materials onto the collectors 22, 24. In the illustrative embodiment, the depositor 52 continuously deposits materials onto the collector 22, 24 as the collector 22, 24 moves (rightward). The deposited materials form a green activation layer 54 on top of the collector 22, 24 as an assembly 56. The assembly 56 may be dried to form a final portion for stack up to form the power source 20.

Figure 6:
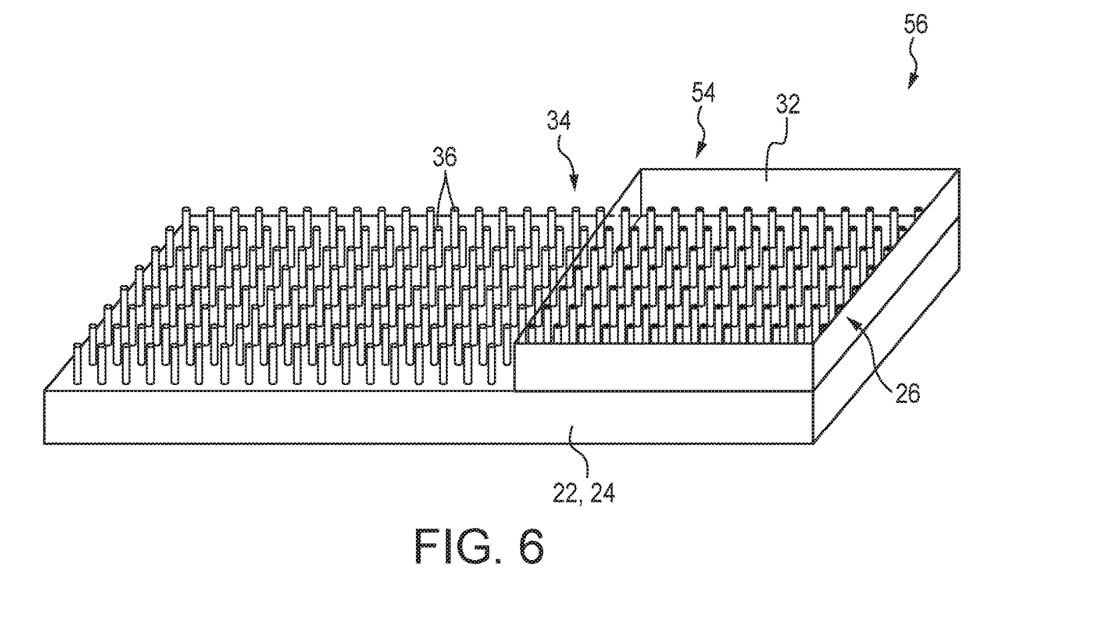
FIG. 6 is a perspective view of the assembly of FIG. 5 showing that the green activation layer includes active material and a number of the containers of the fire suppression means arranged on the collection layer.
Figure 7:
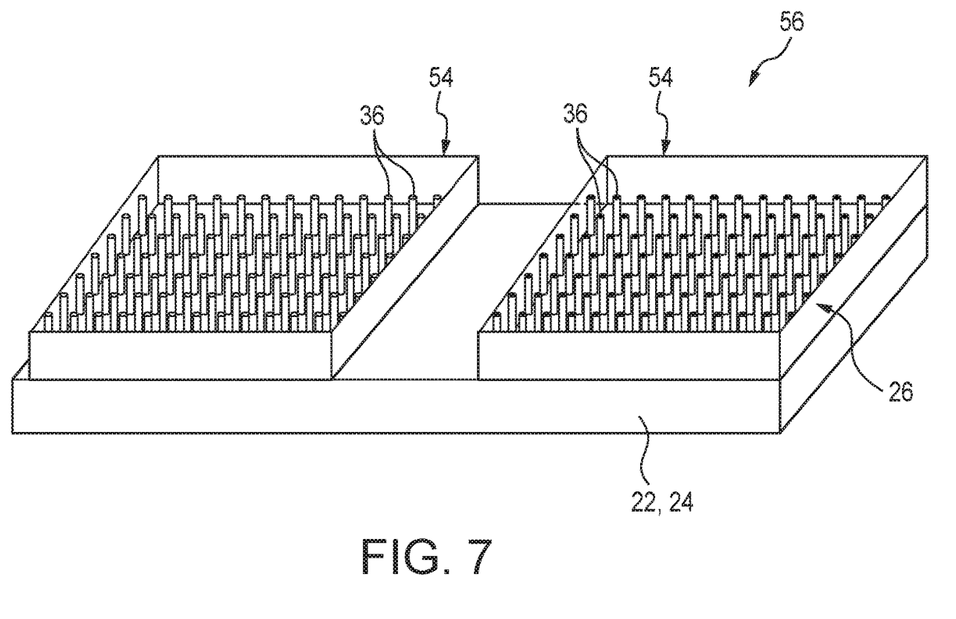
FIG. 7 is a perspective view of the assembly of FIG. 5 showing that in some embodiments, some of the containers can remain empty while some can be filled with fire suppression agent.

As shown in FIG. 6, the assembly 56 is shown including the collector 22, 24 having the fire suppression system 34 deposited by the depositor 52 among the material forming the green activation layer 54 including active material 32 onto the collector 22, 24 and the containers 36. The fire suppression agent 42 may be added to the containers 36 before or after drying. Referring briefly to FIG. 7, some of the containers 36 may remain empty (left side, without fire suppression agent) and may extend entirely between the collector 22,24 and the upper end of the green activation layer 54 for connection with the separator 30 to assist in electron transport, while other containers (right side) may be filled with fire suppression agent. In some embodiments, empty containers 36 for assisting electron transport may be staggered throughout containers 36 that have the agent 42.

Figure 8:
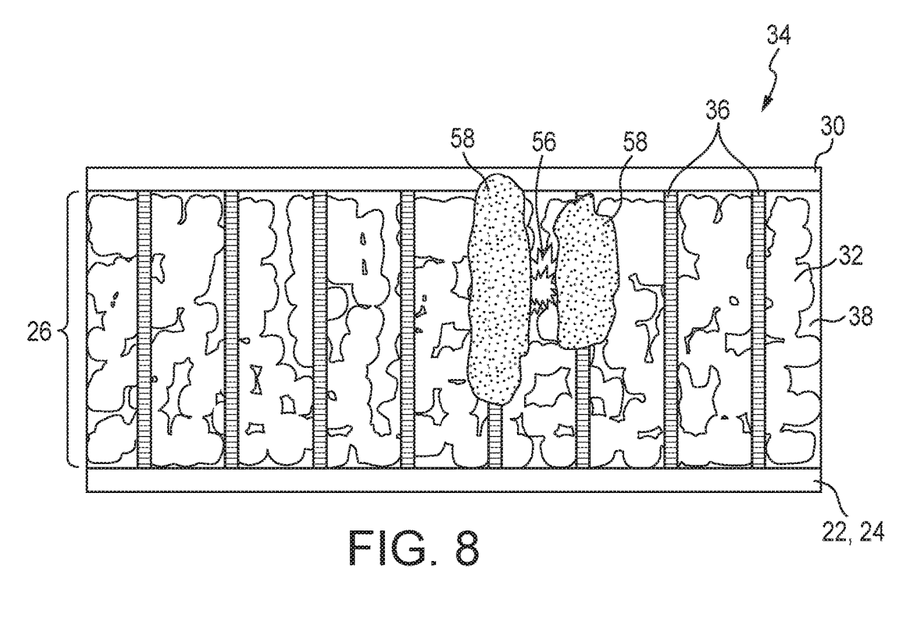
FIG. 8 is a cross-sectional view of an elevation view of the power source of FIGS. 2A and 2B showing that upon local excess in temperature, the containers of the fire suppression means can deform to release the fire suppression agent.
Figure 9:
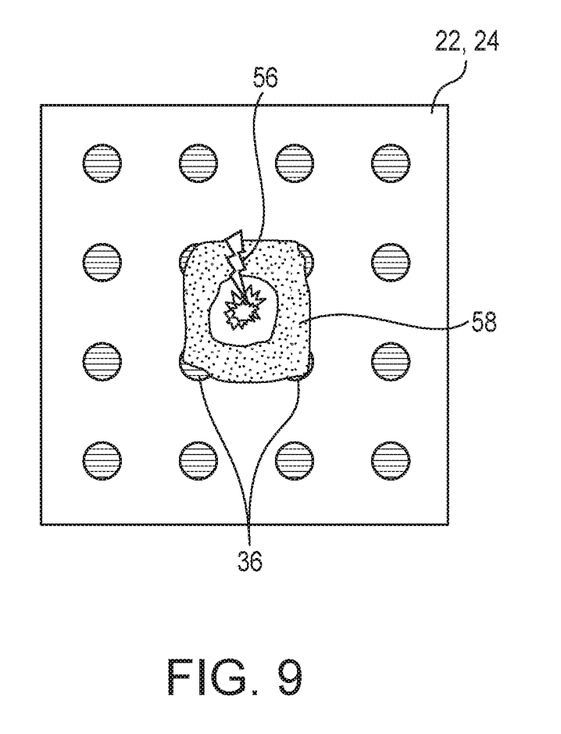
FIG. 9 is a plan view of the power source of FIG. 8 showing that localized heat excess can be contained by localized release of the fire suppression agent.

As shown in FIG. 8, an example of response to excessive heat is illustrated. The collector 22,24 is shown having fire suppression system 34 within the activation section 26. The active material 32 may be deposited onto the collector 22,24 within the activation section 26 as a porous material between the separator 30 and the collector 22,24, having the electrolyte 28 throughout its porous structure. Upon a localized excessive temperature 56, such as from a flame or near onset of a flame, the nearby container(s) 36 which experience the excessive temperature 56 can deform to release the agent 42 therein to the surrounding area as indicated at 58. Referring to FIG. 9, release of agent from multiple containers 36 can converge to control the spread of fire. If excessive temperatures persist, such as from a flame being insufficiently extinguished, additional containers 36 may reach excessive temperature and may release their agent.

The containers 36 of the fire suppression systems of the present disclosure may be formed of thermoplastic adapted to release the fire suppression agent responsive to excessive temperatures. For example, under excessive heat the selected thermoplastic may increase in viscosity, and eventually fail to contain the fire suppression agent within. The temperatures for release of the agent may be selected as a predetermined temperature. Examples of suitable thermoplastics for the containers 36 and/or capsules 44 disclosed herein may include thermoplastics which melt and/or exit their glass region of elastic modulus within the range of about 100° F. to about 500° F. (about 37° C. to about 260° C.). In some embodiments, the thermoplastics may be selected to melt and/or exit their glass region of elastic modulus within the range of about 140° F. to about 302° F. (about 60° C. to about 150° C.), or which melt and/or exit their glass region of elastic modulus within the range of about 175° F. to about 300° F. (about 80° C. to about 150° C.). In order to ensure that the thermoplastic deforms to release the agent, the predetermined temperature may need to exist for a predetermined time, for example, 1-10 seconds. In the event of a short circuit within the activation section 26, for example, through a dendrite or electrical conducting object, a localized excess of heat can occur. For example, for certain cathode materials, a temperature within the range of about 350° F. to about 500° F. (about 180° C. to about 250° C.) can occur and lead to oxygen release from the cathode, which can present a risk of combustion. By configuring the containers 36 to deform to release their fire suppression agent, the risk of combustion can be reduced.

Within the present disclosure, examples of suitable fire suppression agents may include extinguishing agents such as ammonium phosphate monobasic, ammonium carbonate, sodium bicarbonate, sodium sulfate (decahydrate), trisodium phosphate dodecahydrate, magnesium sulfate heptahydrate, calcium sulfate, potassium bicarbonate, potassium sulfate, potassium alum, water, water bonded to a polymer like a gel, wax (for encapsulating the heat spot and/or cutting off the ion conductivity of the area), and/or flame retardants such as triphenyl phosphate (TPP), 9,10-dihydro-9-oxa-10-phosphaphenanthrene 10-oxide (DOPO), perfluoro-2-methyl-3-pentanone (PFMP), trimethyl phosphate (TMP), tris(2,2,2-trifluoroethyl) phosphate, dimethyl methylphosphonate (DMMP), and/or combinations thereof.

The concept of structuring an electrode of a power source for increasing the fast charge capabilities can be used to increase the safety of power sources, such as batteries, to prevent a thermal runaway of a battery cell and propagation through the battery pack. Channels can be applied to provide encapsulated fire suppression agent. In an event of battery failure, like a short circuit from a dendrite or deformation caused by a crash, the area surrounding this short circuit spot can heat up and/or can start side reaction which can lead to a structural collapse on the cathode side by generating pure oxygen which then oxidizes flammable components inside the battery cell. Some fire extinguishing agents can suppress or reduce the reaction speed of some side reactions which can prevent the battery cell from catching fire, but adding such fire extinguishing agents as an additive in electrolyte can tend to lower the performance of the battery. Because of its nature these fire extinguishing agents create some side reactions with the liquid electrolyte during normal use of the battery (charging and discharging).

The present disclose includes devices, systems, and methods for power source safety, and/or power source fire suppression, while maintaining efficient power source performance. Providing container or tube-like structures on the electrode, fire suppression agent can be maintained ready for high and/or excessive temperature events without reducing electrolyte activities. The outer shell of the tube can be formed of a polymer which encapsulates the fire extinguishing agent. The tubes/channels can be placed vertically inside the electrode structure and can distribute the fire suppression agent across the electrode. Now the fire suppression agent is better distributed through the whole electrode layer regardless of porosity of the electrode itself. Tubes/channels may be also combined with the fast charging channels having no fire suppression agent to simultaneously enhance charging.

In some embodiments, fire suppression tubes can be produced as a single core/shell structure and/or using a viscos "gel-like" fluid which may be contained within encapsulated fire extinguishing spheres. The capsules may be bonded together with a binder or glue which can be printed or through casting process put onto the current collector before the actual tape casting of the electrode. A tube/channel may be mounted onto the current collector with an outer shell made of a thermoplastic polymer which has a core filled with fire suppression agent. This could be done via a special doctor blade and/or electrospinning technique. A mixture of spheres containing fire extinguishing agent/flame retardant and binder or adhesive can be printed or cast directly onto the current collector.

Another aspect within the present disclosure is to cast or to print the fire suppression agent with a possible additive or using cold temperature to stabilize the structure first and then to overcoat it with a thermoplastic polymer or a thermoplastic polymer solution which will create a thin polymer film after drying. It is also within the present disclosure to infuse into the fresh not dried cast film of the electrode material with a gel-like fluid containing fire extinguishing spheres with binder. For example, those tubes/channels can be printed onto the current collector via a roll tape casting or a gel printer. The tubes/channels within the present disclosure may be formed to have suitable shapes such as conical, rectangular, cylindrical, cone, and/or pyramidal.

The tubes/channels containing the fire suppression agents may be distributed throughout the activation (electrode) layer. The tubes/channels can be mounted directly onto the current collector. The activation layer (electrode) can be filled with electrolyte and covered with a separator to separate the anode from the cathode. The tubes/channels and/or capsules within the present disclosure, can assist in localized distribution of the fire suppression agents, which can limit the application of fire suppression agent to the effected local area, and not to the entire electrode or battery, which can enhance electrical performance. Moreover, the tubes/channels may be formed as pillars distributed through the activation section (electrode). The encapsulating material only melts with heat and releases the fire suppression agent facing the heat source. The fire suppression agent may be directed towards the hottest areas, shielding other areas from the heat spot, attempting to cool the heat spot, and/or eliminating the free radicals to stop further side or chain reactions. In some embodiments, the power source 20 may be a fuel cell, such as a hydrogen fuel cell, for providing hydrogen for combustion in the motor of the power train 16 for propulsion and/or electric power generation.

Accordingly to an aspect of the present disclosure, a power storage device may be formed as a lithium-ion battery containing an electrode with anode active material, a cathode electrode with active material, current collector for anode and cathode side, a separator and electrolyte. At least one of the anode and cathode side may contain tubes/channels encapsulating fire suppression agent. Those tubes/channels may be vertically integrated into the electrode structure of the anode and/or cathode.

In some embodiments, the tubes/channels may be formed as hollow tubes made of a thermoplastic. The tubes/channels may have a diameter of about 0.5 to about 5000 μm. The tubes/channels may have a diameter of about 5 to about 2000 μm, about 10 to 1000 about μm, or about 20 to about 500 μm, and/or combinations thereof between different tubes/channels. The length of this tubes/channels may have the same dimension as the thickness of the electrode, or may be shorter than the actual electrode thickness.

In some embodiments, the fire suppression agent may be encapsulated within a thermoplastic polymer. The thermoplastic may melt if the temperature rises and releases the fire suppression agent. The melting temperature may be between about 50° C. to about 250° C., for example, between about 60° C. to about 150° C. In some embodiments, the tubes/channels may be filled with fire suppression agent. In some embodiments, about 5% to about 100% of the tubes/channels in the electrode structure may be filled with fire suppression agent.

In some embodiments, the tubes/channel may be formed using a doctor blade method, tape casting, and/or an ink-jet printing technique directly onto the current collector. The tubes/channels may be formed by an electrospinning technique directly onto the current collector.

In some embodiments, the tubes/channels may be filled with spheres formed with a thermoplastic polymer like a core/shell structure containing fire suppression agent encapsulated therein. In some embodiments, the spheres may be bonded externally together with binder, glue, and/or adhesive to create a solid tube/channel/rod.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, disclosed embodiments are deemed to inherently include all such elements, variations, and modifications to the described aspects that would be known to those of ordinary skill in the art.

According to another aspect of the present disclosure, a power storage device for providing motive power for a transportation vehicle having a chassis and a power train arranged for at least partial electric drive along roadways, may include a pair of collectors configured for opposite electrical charge from each other, an activation layer comprising electrolyte disposed between the collectors, and a fire suppression system for releasing fire suppression agent responsive to high and/or excessive temperature. The fire suppression system may disposed within the activation layer.

In disclosed embodiments, the fire suppression system may be adapted to release fire suppression agent responsive to a local temperature exceeding a predetermined threshold. The predetermined threshold may include a predetermined temperature. The predetermined threshold may include a predetermined duration of the predetermined temperature. The fire suppression means may include at least one container for housing fire suppression agent. The at least one container may include a barrier defining a receptacle for housing the fire suppression agent. The barrier may include a thermoplastic. The thermoplastic is configured to weaken at high and/or excessive temperature to release the fire suppression agent.

In disclosed embodiments, the thermoplastic may include a melt temperature within the range of 100° F. to 500° F. The thermoplastic may include a melt temperature within the range of 175° F. to 300° F. The at least one container may be engaged with at least one of the pair of collectors and extends longitudinally through the electrolyte of the activation layer. The at least one container may include a plurality of containers spaced apart from each other within the activation layer.

According to another aspect of the present disclosure, a method of assembly of a power device for providing motive power for a transportation vehicle, may include distributing a green activation layer onto a collector layer adapted for electrical charge, wherein the green activation layer includes at least one fire suppression container for housing fire suppression agent, and drying the green activation layer. In disclosed embodiments, the at least one fire suppression container may include a thermoplastic. Distributing the green activation layer may include at least one of tape casting and jet printing.

In disclosed embodiments, the power source is embodied as a battery, namely a lithium-ion battery, however, in some embodiments, the power source may include a fuel cell generation fuel for combustion to generate electric power.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A transportation vehicle for at least partial electric drive operation on roadways, the transportation vehicle comprising:
   a vehicle base including a chassis,
   a drive train coupled with the chassis to drive the chassis along roadways, and
   a power storage device connected with the drive train to provide motive power, the power storage device including a pair of collectors configured for opposite electrical charge from each other, an activation layer comprising electrolyte disposed between the collectors, and a fire suppression system including a number of containers each housing fire suppression agent for release responsive to high temperature, the containers extending longitudinally through the electrolyte of the activation layer spaced apart from each other.

2. The transportation vehicle of claim 1, wherein the fire suppression system is adapted to release fire suppression agent responsive to high temperature as a local temperature exceeding a predetermined threshold.

3. The transportation vehicle of claim 2, wherein the predetermined threshold includes a predetermined temperature.

4. The transportation vehicle of claim 3, wherein the predetermined threshold includes a predetermined duration of the predetermined temperature.

5. The transportation vehicle of claim 1, wherein the at least one container includes a barrier defining a receptacle for housing the fire suppression agent.

6. The transportation vehicle of claim 5, wherein the barrier includes a thermoplastic.

7. The transportation vehicle of claim 6, wherein the thermoplastic is configured to weaken at high temperature to release the fire suppression agent.

8. The transportation vehicle of claim 6, wherein the thermoplastic includes a melt temperature within the range of 100° F. to 500° F.

9. The transportation vehicle of claim 8, wherein the thermoplastic includes a melt temperature within the range of 175° F. to 300° F.

10. The transportation vehicle of claim 1, wherein at least one of the containers is engaged with at least one of the pair of collectors.

11. The transportation vehicle of claim 1, wherein the containers include a number of capsules each containing fire suppression agent.

12. A power storage device for providing motive power for a transportation vehicle having a chassis and a power train arranged for at least partial electric drive along roadways, the power storage device comprising:
    a pair of collectors configured for opposite electrical charge from each other, an activation layer comprising electrolyte disposed between the collectors, and
    a fire suppression system including a number of containers each housing fire suppression agent for release responsive to high temperature, the containers extending longitudinally through the electrolyte of the activation layer spaced apart from each other.

13. The power storage device of claim 12, wherein the fire suppression system is adapted to release fire suppression agent responsive to high temperature as a local temperature exceeding a predetermined threshold.

14. The power storage device of claim 13, wherein the predetermined threshold includes a predetermined temperature.

15. The power storage device of claim 13, wherein the predetermined threshold includes a predetermined duration of the predetermined temperature.

16. The power storage device of claim 12, wherein the containers include a barrier defining a receptacle for housing the fire suppression agent.

17. The power storage device of claim 16, wherein the barrier includes a thermoplastic.

18. The power storage device of claim 17, wherein the thermoplastic is configured to weaken at high temperature to release the fire suppression agent.

19. The power storage device of claim 17, wherein the thermoplastic includes a melt temperature within the range of 100° F. to 500° F.

20. The power storage device of claim 19, wherein the thermoplastic includes a melt temperature within the range of 175° F. to 300° F.

21. The power storage device of claim 12, wherein at least one of the containers is engaged with at least one of the pair of collectors.

22. The power storage device of claim 12, wherein the containers include a number of capsules each containing fire suppression agent.

* * * * *